United States Patent [19]

Weiss

[11] 4,404,899
[45] Sep. 20, 1983

[54] TOASTERS

[76] Inventor: Joseph Weiss, 134 W. 93rd St., New York, N.Y. 10025

[21] Appl. No.: 139,192

[22] Filed: Apr. 11, 1980

[51] Int. Cl.³ .............................................. A47J 37/08
[52] U.S. Cl. .................................... 99/332; 99/337; 99/391
[58] Field of Search ...................... 99/329 R, 331, 341, 99/391, 395, 402, 427, 326, 327, 337, 385, 393, 399, 401

[56] References Cited

U.S. PATENT DOCUMENTS

| | | | |
|---|---|---|---|
| 2,194,859 | 3/1940 | Malmquist et al. | 99/328 |
| 2,339,183 | 1/1944 | Myers | 99/327 |
| 2,502,655 | 4/1950 | Kitto | 99/329 R |
| 2,662,465 | 12/1953 | Beer | 99/391 X |
| 2,666,380 | 1/1954 | Badenoch | 99/329 R |
| 2,693,750 | 11/1954 | Badenoch | 99/329 R |
| 2,989,915 | 6/1961 | Lonzi | 99/391 |
| 2,997,941 | 8/1961 | Phelan et al. | 99/391 X |
| 3,087,416 | 4/1963 | Drews | 99/395 X |
| 3,298,300 | 1/1967 | Grebow et al. | 99/337 |
| 3,760,713 | 9/1973 | Sato | 99/393 X |
| 4,250,803 | 2/1981 | Wohlfart | 99/427 X |
| 4,254,695 | 3/1981 | Landry | 99/334 |
| 4,285,272 | 8/1981 | Klijnstra | 99/391 |

FOREIGN PATENT DOCUMENTS 763736 12/1956 United Kingdom .................. 99/341

*Primary Examiner*—Philip R. Coe
*Assistant Examiner*—Frankie L. Stinson

[57] ABSTRACT

The means shown and described in the specifications to activate the covers can be modified and/or varied using different means. A year of evaluating and testing a working model of a toaster using the disclosed design proved it to be economically and practically superior over other means being considered. Its means of operation prevented damaging of food which, for any reason, protruded out of the toaster's receptacles. The normal operation of the toaster is not affected. The covers do not interfere with the pop up of the toaster. The versatility of the covers' design permits it to be utilized to cover the receptacles to keep the toast warm after toasting without the use of electrical energy, and to cover the receptacles when the toaster is not being used. Better tasting toast is produced as the result of convection toasting effected by the covering of the receptacles.

16 Claims, 9 Drawing Figures

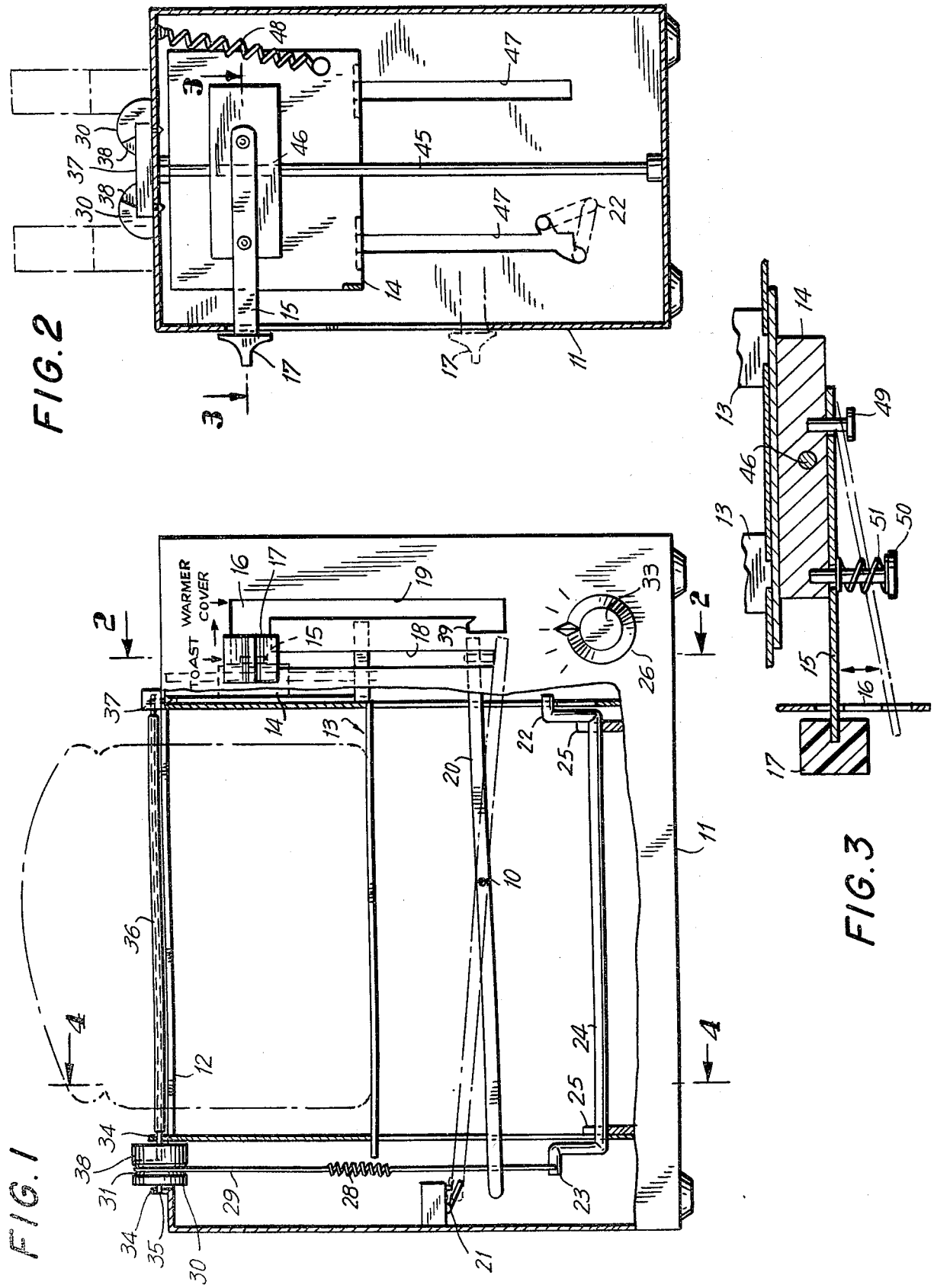

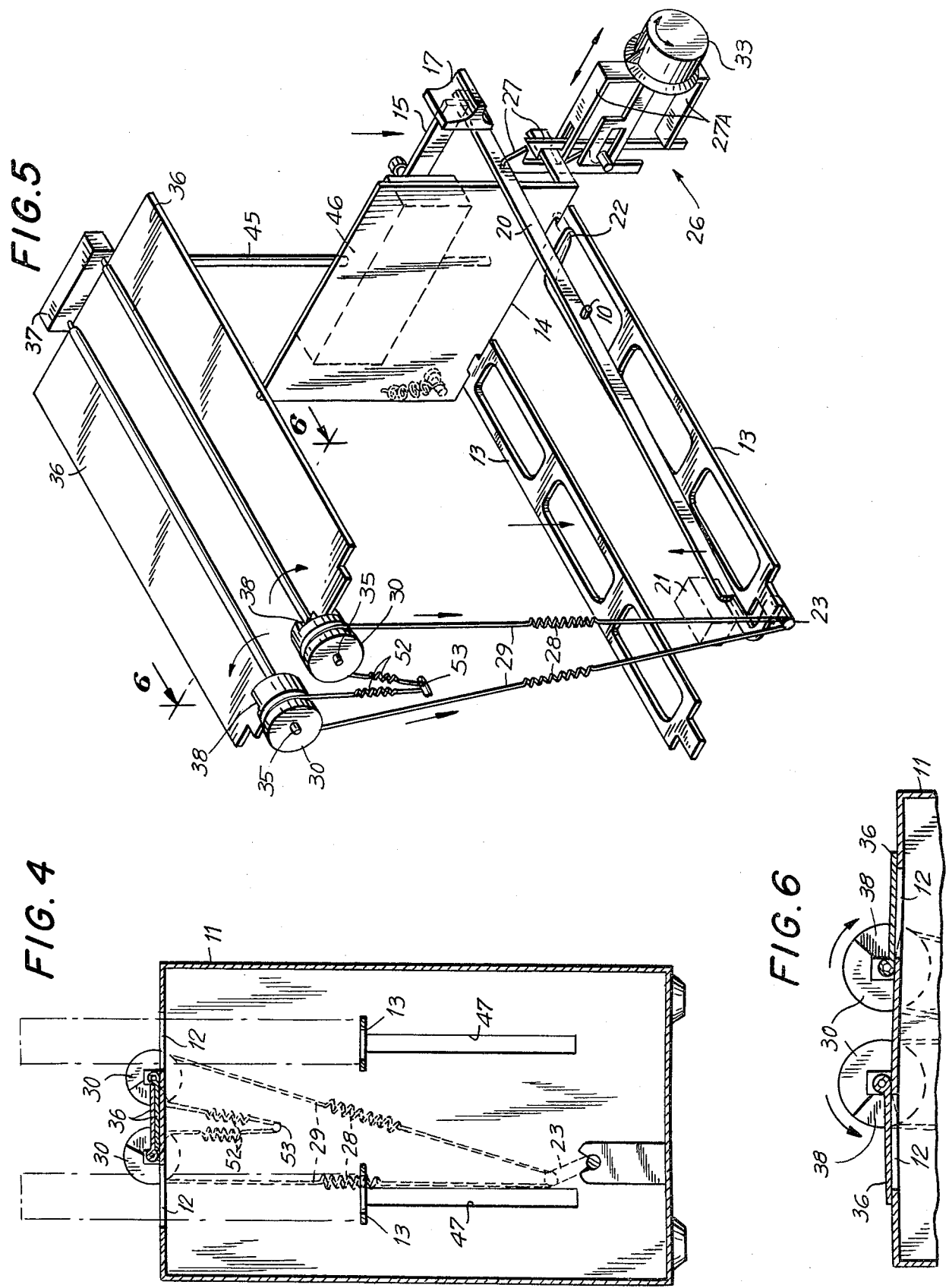

TOASTERS

This invention relates to improvements in electric toasters and particularly to means for the conservation of electricity.

The toaster has remained basically unchanged for more than fifty years. Its present design allows most of the heat generated for toasting to be wasted into the ambient atmosphere. Conventional toasters have receptacles with uncovered slots by which the food to be toasted is inserted into the receptacles onto a movable rack and lowered between heating elements. When the toaster is operative much of the heat generated for toasting escapes through the uncovered slots, thereby increasing the amount of electricity used.

The open slotted receptacles are proven health and safety hazards. People, especially children, have explored and put their fingers and metal objects into the uncovered receptacles, incurring serious burns. The open mouthed toaster has caused many electrical mishaps and fires due to combustible materials and metallic objects which unknowingly or accidentally fell into the uncovered receptacles. The uncovered slots permits food and other organic matter to fall into the toaster and contaminate the food inserted for toasting.

The principal object of the invention is the conservation of electrical energy and to reduce by 25% the amount of electricity would otherwise be consumed by a toaster, without the invention to achieve the same degree of toasting.

Another object is further conservation of electricity by keeping the toast warm after toasting without using electricity.

Another object is to provide means to eliminate health and safety hazards inherent in the conventional toaster.

To accomplish those objects and others, the invention consists of means whereby the open slotted receptacles are covered, as hereinafter disclosed.

In the following description of the invention a toaster with a plurality of receptacles and a heat-timer hold-release mechanism is illustrated, solely for the purpose of illustration. In the invention when the toaster's movable racks are lowered by the lowering of the toaster's control lever covers are automatically activated to cover the receptacles' open slots, the covers are automatically activated to uncover the receptacles when the racks are freed to rise. The covers' mechanism is designed to permit the covers to be moved by means other than that of its automatic activating means.

To make my invention more clear the same is illustrated in the accompanying drawings in which similar reference characters denote corresponding parts and in which only those components of the invention are shown and described. The toaster's construction, its components and mode of operation are conventional and well-known and does not require description, it will be referred to only where necessary in the specifications.

FIG. 1 is a front elevation view of a toaster partially broken away.

FIG. 2 is a cross section view taken along lines 2—2 of FIG. 1.

FIG. 3 is a cross section view taken along lines 3—3 of FIG. 2.

FIG. 4 is a cross section view taken along lines 4—4 of FIG. 1.

FIG. 5 is a perspective view of important parts of the invention.

FIG. 6 is a partial cross section taken along lines 6—6 of FIG. 5.

Figure 8:
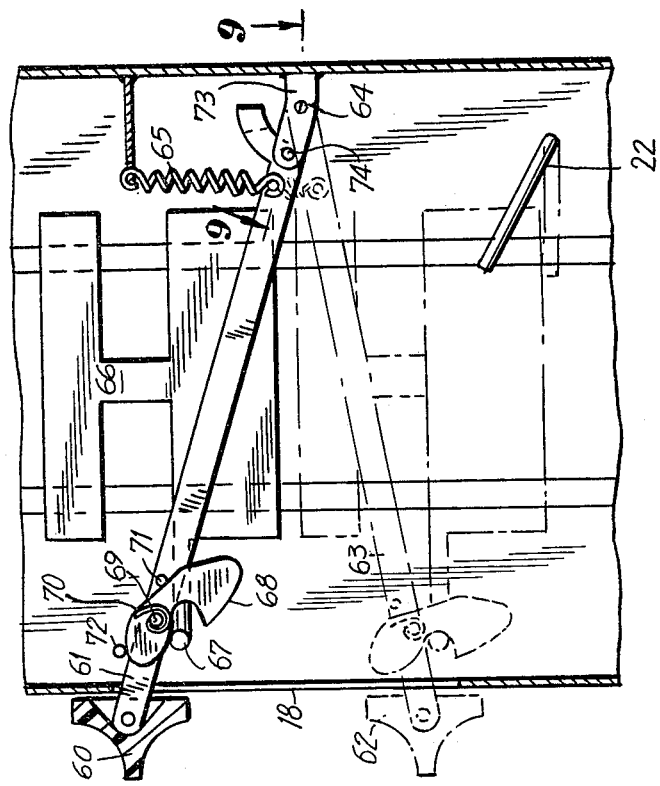
FIG. 8 is a cross section view taken along lines 8—8 of FIG. 7.

In FIG. 1 numeral 11 denotes the toaster, 12 the toaster's open slotted receptacles, rack 13 affixed to rack assembly 14, the toaster's control lever 15 affixed to rack assembly 14 and shown protruding through opening 16, knob 17 is secured to lever 15, slots 18 and 19 provide passage and guidance for control lever 15 when it is depressed downward in either one of the two slots. Slots 18 and 19 are joined at their upper end by opening 16 and in which lever 15 is laterally movable. Lever 20 movably affixed at 10 is in alignment with slot 18 and adapted to be actuated by control lever 15 to close normally open electric switch 21 when lever 15 is lowered in slot 18. Levers 22 and 23 of shaft 24 rotatably mounted in bearings 25 are adapted to be moved downward by rack assembly 14 actuating lever 22. Spring 28 is secured to lever 23 and to flexible drive 29 which is affixed to rotor 30 at 31 in groove 32, rotor 30 is rotatably mounted in bearings 34 by means of axle pin 35 which also is the hinge pin for rotatable cover 36 hinged at its other end at 37 and in engagement with rotor 30 at 38. 26 is the toaster's heat-timer hold-release mechanism which retains rack assembly 14 and control lever 15 in lowered position, 26 is adapted to be actuated automatically and/or manually, manual release of rack assembly 14 and control lever 15 from the toaster's hold means of 26 is achieved by actuating knob 33 of 26. Slot 19 being shaped at its lower end at 39 to act as a catch to receive and retain control lever 15 in its lowered position. This is an optional feature and can be dispensed with, if so desired, where catch 39 is implemented the holding means of 26 can be rendered ineffective when control lever 15 is lowered in slot 19, if so desired, the use of catch 39 in combination with the holding means of 26 provides a double safety feature which parents with young children find a desirable option.

FIG. 2 is a cross section view of FIG. 1 and shows control lever 15 affixed to rack assembly 14 axially movable on guide rail post 45 which passes through bearing 46 of 14. Slots 47 provide passage and guidance for racks 13, return spring 48 elevates rack assembly 14 when it is lowered and then freed. 37 is affixed in place by snap-in type fastners for quick and easy installation and removal of covers 36. Control lever 15, rack assembly 14 and lever 22 are depicted in activated and inactivated settings.

FIG. 3 illustrates control lever 15 being capable of lateral movement in opening 16 by means of pins 49 and 50 which affixes lever 15 to rack assembly 14 and also permits some lateral movement of lever 15, spring 51 restricts free floating of lever 15 and urges it into engagement with catch 39 when it is incorporated in the structure as an optional feature.

FIG. 4 is a cross section view of FIG. 1 taken along lines 4—4 and depicts lever 23, rotors 30 and covers 36 being inoperative and receptacles 12 uncovered. Return springs 52 secured at 53 are joined to flexible drives 29 and exert spring tension on rotors 30 to rotate covers 36 to a position which permits the covers to come to rest in a horizontal plane where they are inoperative. Springs 28 are designed to stretch where there is an obstacle in the travel path of the covers and/or when a force greater than is normally required to rotate rotors 30 against springs 52 is applied. This is an optional feature and can be dispensed with, if desired, by securing flexible drives 29 directly to lever 23. The angles of the flexible drives 29 as they relate to rotors 30 are utilized to control and limit the movement of the rotors instead of stops which would then be supurious.

FIG. 5 is a perspective view of important parts of the invention being operational, and shows levers 22, 23, 20, electrical switch 21, rotors 30 and covers 36 activated, and racks 13, rack assembly 14 and control lever 15 being retained in their lowered position by holding means 27 of the toaster's mehanism 26. Levers 22 and 23 being moved downward by rack assembly 14 rotated rotors 30, against the tension of springs 52, to move covers 36 out of their inoperative horizontal position to a vertical position and where further rotation of the covers, by rotors 30, exceeds 90 degrees the covers being loosely engaged with the rotors at 38 can rotate independently of the rotors to come to rest in a horizontal plane where they are operative and cover the slots of the receptacles 12, refer to FIGS. 4 and 6. Upward movement of levers 23 and 22 permit springs 52 to rotate rotors 30 in a reversal mode of operation to uncover receptacles 12. The rotatable covers 36 can be actuated by other means, then those shown, such as electro-mechanical, gears, linkage, etc. The novel means herein disclosed was implemented as being the most economical and most practical, it prevents the damaging of food which, for any reason, protrudes above the top surface of the receptacle and it does not interfere with the normal operation of the toaster.

FIG. 6 is a partial cross section view showing the covers 36 in activated position covering the slots of receptacles 12.

Its operation, for example, when slices of bread are to be toasted is as follows; slices of bread are inserted into the receptacles 12 where they rest on racks 13, control lever 15 is lowered in slot 18 lowering rack assembly 14 and the racks 13 fully within the toaster, control lever 15 also actuates lever 20 to close electrical switch 21 to energize the heating elements for toasting, at the same time rack assembly 14 has moved levers 22 and 23 downward to activate covers 36 to cover receptacles 12. Rack assembly 14 and control lever 15 are retained in their lowered position by holding means 27, when the toaster pops or the release means 27A of 33 is manually actuated to permit rack assembly 14 and control lever 15 to elevate, switch 21 opens and the covers are activated to uncover receptacles 12, as previously described.

When it is desired to keep the toast warm after toasting and cover the receptacles when the toaster is not being used for toasting control lever 15 is moved laterally in opening 16 and lowered in slot 19 lowering rack assembly 14 and thereby activating the covers 36 to cover the receptacles 12, electrical switch 21 is not affected. Control lever 15 and rack assembly 14 are retained in their lowered position by holding means 27 or optional catch 39 and/or in combination. To uncover the receptacles release knob 33 is actuated, if optional catch 39 is utilized the control lever 15 is manually disengaged from catch 39 to permit rack assembly 14 and control lever 15 to elevate and covers 36 are then activated to uncover the receptacles.

Figure 7:
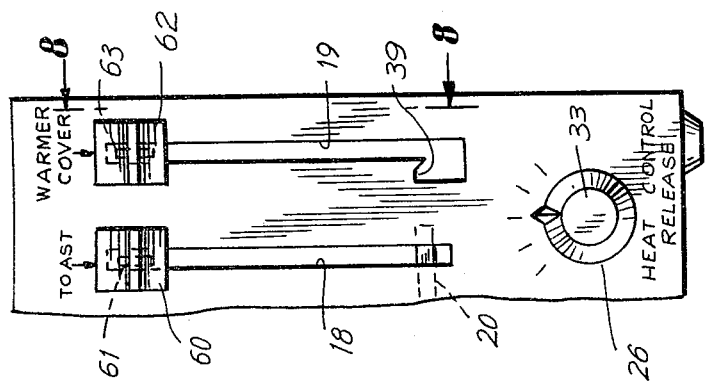
FIG. 7 is a partial front elevation of an alternate embodiment.

FIG. 7 is a partial front elevation of an alternate embodiment of FIG. 1 in which there are two control levers, instead of the conventional single control lever, to perform the same functions as those described for control lever 15. Knob 60 is affixed to control lever 61 which extends through slot 18, knob 62 is affixed to control lever 63 which extends through slot 19. When control lever 61 is lowered in its slot 18, racks 13 and rack assembly 66 are lowered and lever 22 is moved downward activating covers 36 to cover the receptacles 12 and at the same time control lever 61 closes electrical switch 21 to energize the heating elements for toasting, when the toaster pops rack assembly 66 and control lever 61 are freed to elevate, switch 21 opens and the covers 36 are activated to uncover the receptacles. When control lever 63 is lowered in its slot 19 rack assembly 66 being lowered moves lever 22 downward to activate covers 36 to cover the receptacles 12, switch 21 is not affected, when control lever 63 and rack assembly 66 are freed to elevate covers 36 are activated to uncover the receptacles, as previously described.

FIG. 8 is a cross section view of FIG. 7 showing control levers 61 and 63 movable affixed at 64 and maintained, when not lowered, in a raised position by springs 65, rack assembly 66 has an extension arm 67 adapted to be engaged and lowered by either one of control levers 61 or 63 and when lowered lowers rack assembly 66. Affixed to control levers 61 and 63 are identical catches 68, when lever 61 or lever 63 is lowered spring 70 urges catch 68 towards stop 71 and catch 68 engages arm 67, when levers 61 and 63 are in raised position catch 68 butts against stop 72 and is moved out of engagement with arm 67. In the drawing control lever 61 is depicted in its raised position and catch 68 inoperative, control lever 63 is in a lowered position and catch 68 operative and in engagement with arm 67. Lever 22 is depicted in activated and inactivated positions. Rack assembly 66 is depicted in raised and lowered positions.

Figure 9:
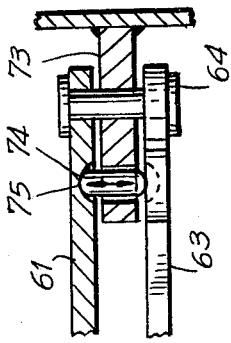
FIG. 9 is a cross section view taken along lines 9—9 of FIG. 8.

FIG. 9 is a cross section view of FIG. 8 along lines 9—9 of interlock means 73 which prevents simultaneous lowering of control levers 61 and 63. Control levers 61 and 63 are movably affixed on 73 at 64, floating pin 74 is adapted to engage recess 75 in either one of the control levers when either one of them is moved downward and thereby moving pin 74 into the recess 75 of the other lever locking it in place.

While I have illustrated in the drawings and hereinabove described examples of the manner in which my invention may be practiced, it will be understood by those skilled in the art that many modifications of the disclosed structures may be made without departing from the spirit of the invention or the scope of the appended claims.

I claim:

1. In a device, such as a toaster, having an open slotted receptacle, a control lever, a movable rack affected by said control lever, a movable member and a rotatable member, said members being coupled to each other and whereby said coupling permits some movement of either of said members without affecting the other of said members, and whereby when said movement of either of said members is greater than said coupling permits, the other member is affected, and when said control lever is activated in one direction, said control lever affects said movable rack, said movable member and said rotatable member to effect the covering of said receptacle and when said control lever is activated in the opposite direction, said receptacle is uncovered.

2. In the device of claim 1 where there are a plurality of open slotted receptacles and at least one movable member and at least one rotatable member coupled to each other to cover and uncover said open slotted receptacles.

3. In the device of claim 1 in which said movable member and said rotatable member are coupled to each other to permit said rotatable member when not in motion to rest in a horizontal plane, whereby said movable member moves said rotatable member more than 90 degrees, said rotatable member being capable of rotating independently of said movable member to come to rest in the horizontal plane initiated by said movable member.

4. In the device of claim 3 in which rotation of said rotatable member independently of said movable member is induced by gravity.

5. In a toaster having open slotted receptacles, heating elements, a control lever, a switch adapted to be actuated by said control lever, movable racks actuated by said control lever, flaps to cover said receptacles, and whereby said control lever is depressed said movable racks are lowered, said switch is actuated and said flaps are activated to cover said receptacles, and when said movable racks elevate said switch becomes inoperative and said flaps are activated to uncover said receptacles, a second lever for lowering said movable racks and activating said flaps to cover said receptacles, holding means to retain said second lever in its lowered position, and whereby said second lever is manually freed of said holding means said movable racks elevate and said flaps are activated to uncover said receptacles.

6. In a toaster having open slotted receptacles, rotatable covers, movable racks, heating elements, electric switch, heat-timer hold-release mechanism, a control lever which protrudes through an opening in the toaster's panel and there are two slots, to provide passage and guidance for said control lever when it is moved downward, said two slots being designated as first slot and second slot, and being joined at their upper end by the opening through which said control lever extends, said second slot is utilized when it is desired to keep the toast warm and cover the receptacles when the toaster is not being used for toasting, whereby lowering said control lever in said first slot for toasting lowers said movable racks and said rotatable covers are activated to cover said receptacles and said electric switch is closed to energize said heating elements, said heat-timer hold-release mechanism maintains said movable racks and said control lever in their lowered position until the toasting process is completed or its release mechanism is manually activated, and when said control lever and said movable racks elevate, said electric switch opens, and said rotoable covers are activated to uncover said receptacles, whereby lowering said control lever in said second slot lowers said movable racks and said rotatable covers are activated to cover said receptacles, said electric switch is not affected, said movable racks and said control lever are retained in their lowered position by the holding mechanism until manually released from said holding mechanism after which said movable racks and said control lever are free to elevate and said rotatable covers are activated to uncover said receptacles.

7. In a toaster of claim 6 in which the lower end of said second slot is shaped to act as a catch to receive and hold said control lever in its lowered position until manually released from said catch.

8. In a toaster having open slotted receptacles, movable racks, heating elements, heat-timer hold-release mechanism, an electric switch normally open, rotatable covers to cover said receptacles when said movable racks are lowered and to uncover said receptacles when said movable racks elevate, two control levers designated as first control lever and second control lever depressing said first control lever downward in its slot lowers the movable racks, activates the rotatable covers to cover the receptacles, and closes said electric switch to initiate toasting, the hold-release unit of said heat-timer mechanism being adapted to be activated automatically and/or manually and holding the lowered movable racks and said first control lever in their lowered position until the toasting process is completed or its release mechanism is manually activated to permit said first control lever and said movable racks to elevate, the rotatable covers are then activated to uncover said receptacles, and said electric switch is opened, depressing said second control lever in its slot lowers said movable racks and activates said rotatable covers to cover said receptacles, without affecting said electric switch, said second control lever and said movable racks being retained in their lowered position by said holding means until manually disengaged, when said movable racks and said second control lever elevate said rotatable covers are activated to uncover said receptacles.

9. In a toaster in claim 8 in which the slot said second control lever moves in is shaped at its lower end to act as a catch to receive and hold said second control lever in its lowered position until it is manually disengaged from said catch.

10. In a toaster in claim 8 in which means are provided to prevent simultaneous lowering of said first and said second control levers.

11. In a toaster having open slotted receptacles, a first slot and a second slot, to provide passage and guidance for the toaster's control lever, movable racks adapted to be lowered by said control lever, movable covers adapted to be moved in the same plane as that of the toaster's top surface, including means to activate said covers to cover said receptacles when said control lever and said racks are lowered and to uncover said receptacles when said control lever and said racks elevate, hold-release means to retain said control lever and said racks in their lowered position, an electric circuit normally open and adapted to be closed and energize the toaster's heating elements, when said control lever is lowered in said first slot said racks are lowered, said covers are activated to cover said receptacles and said electric circuit is closed, when said control lever and said racks are freed to elevate, said electric circuit is opened and said covers are activated to uncover said receptacles, when said control lever is lowered in said second slot, said racks are lowered and said covers are activated to cover said receptacles, and when said control lever and said racks are free to elevate said covers are activated to uncover said receptacles.

12. In a toaster in claim 11 in which said control lever protrudes through an opening in the toaster's panel, and whereby said first slot and said second slot being joined at their upper end by said opening through which said control lever extends, said control lever being laterally movable in said opening and adapted to be moved downward in either said first slot or said second slot.

13. In a toaster having open slotted receptacles, a first control lever and a second control lever, to lower the toaster's movable racks, movable covers adapted to be moved in the same plane as that of the toaster's top surface, including means to activate said covers to cover said receptacles when said racks are lowered and to uncover said receptacles when said racks elevate, hold-release means to retain said racks in their lowered position until said hold-release means are activated to release said racks, heating elements, an electric circuit normally open and adapted to be closed to energize said heating elements for toasting, when said first control lever is lowered said racks are lowered, said covers are activated to cover said receptacles and said electric circuit is closed, when said racks and said first control lever are freed to elevate said electric circuit is opened and said covers are activated to uncover said receptacles, when said second control lever is depressed said racks are lowered and said covers are activated to cover said receptacles, when said racks and said second control lever are free to elevate said covers are activated to uncover said receptacles, an interlock to prevent simultaneously lowering of said first and said second control levers.

14. In a toaster in claim 6 in which said control lever being laterally movable in said opening and adapted to be moved downward in either said first slot or said second slot.

15. In a device of claim 1 in which said movable member has a recess which loosely accommodates said rotatable member and is the means by which said movable member is capable of some movement without affecting said rotatable member and is the means by which said rotatable member is capable of some movement without affecting said movable member.

16. In a toaster having at least one open slotted receptacle, at least one movable rack and at least one control lever for lowering aforesaid movable rack, at least one rotatable cover for covering said receptacle, at least one movable member, and a first resilient means whereby when said movable member is moved in one direction said movement is transmitted by said first resilient means to said rotatable cover to effect the covering of said receptacle, a second resilient means whereby when said movable member is moved in the opposite direction said second resilient means effects the uncovering of said receptacle, said first and said second resilient means being capable of yielding when a predetermined force is exceeded.

* * * * *